(12) United States Patent
Delaney, Jr. et al.

(10) Patent No.: US 8,263,939 B2
(45) Date of Patent: Sep. 11, 2012

(54) COMPRESSIVE MILLIMETER WAVE IMAGING

(75) Inventors: Michael Joseph Delaney, Jr., Thousand Oaks, CA (US); David Arthur Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 12/427,283

(22) Filed: Apr. 21, 2009

(65) Prior Publication Data

US 2010/0264316 A1  Oct. 21, 2010

(51) Int. Cl.
*G01F 23/00* (2006.01)

(52) U.S. Cl. .................................... 250/358.1

(58) Field of Classification Search ............... 250/358.1
See application file for complete search history.

(56) References Cited

U.S. PATENT DOCUMENTS

| | | | |
|---|---|---|---|
| 4,615,619 A * | 10/1986 | Fateley | 356/310 |
| 4,623,894 A * | 11/1986 | Lee et al. | 343/700 MS |
| 4,864,309 A * | 9/1989 | Wiley et al. | 342/351 |
| 5,121,124 A | 6/1992 | Spivey et al. | |
| 5,365,237 A | 11/1994 | Johnson et al. | |
| 5,905,473 A * | 5/1999 | Taenzer | 343/834 |
| 5,923,036 A | 7/1999 | Tague, Jr. et al. | |
| 5,982,326 A * | 11/1999 | Chow et al. | 342/365 |
| 6,359,582 B1 * | 3/2002 | MacAleese et al. | 342/22 |
| 6,483,480 B1 | 11/2002 | Sievenpiper et al. | |
| 6,485,152 B2 * | 11/2002 | Wood | 359/853 |
| 6,501,414 B2 * | 12/2002 | Arndt et al. | 342/22 |
| 6,538,621 B1 | 3/2003 | Sievenpiper et al. | |
| 6,552,696 B1 | 4/2003 | Sievenpiper et al. | |
| 6,791,730 B2 * | 9/2004 | Sniegowski et al. | 359/223.1 |
| 6,965,340 B1 * | 11/2005 | Baharav et al. | 342/22 |
| 7,068,415 B2 | 6/2006 | Mushika | |
| 7,173,565 B2 | 2/2007 | Sievenpiper | |
| 7,197,800 B2 | 4/2007 | Sievenpiper et al. | |
| 7,245,269 B2 | 7/2007 | Sievenpiper et al. | |
| 7,253,780 B2 | 8/2007 | Sievenpiper | |
| 7,382,959 B1 | 6/2008 | Jacobsen | |
| 7,385,549 B2 | 6/2008 | Lovberg et al. | |
| 7,432,843 B2 | 10/2008 | Brady et al. | |

(Continued)

FOREIGN PATENT DOCUMENTS

GB 2283386 A 5/1995

(Continued)

OTHER PUBLICATIONS

Jacobsen et al., "Micro-scale Truss Structures formed from Self-Propagating Photopolymer Waveguides", Advanced Materials, 2007, pp. 3892-3896.

(Continued)

*Primary Examiner* — David Porta
*Assistant Examiner* — Djura Malevic
(74) *Attorney, Agent, or Firm* — Yee & Associates, P.C.

(57) ABSTRACT

An apparatus comprising a mirror array having a plurality of mirrors and a control system. The plurality of mirrors is capable of receiving a signal for an image. The control system is capable of controlling a first portion of the plurality of mirrors in the mirror array to direct a first portion of the signal to a detector. The control system is also capable of controlling a second portion of the plurality of mirrors in the mirror array to direct a second portion of the signal away from the detector.

27 Claims, 15 Drawing Sheets

U.S. PATENT DOCUMENTS

| | | | |
|---|---|---|---|
| 7,432,846 B2 | 10/2008 | Martin et al. | |
| 7,483,126 B2 * | 1/2009 | Volfman et al. | 356/218 |
| 7,598,502 B2 * | 10/2009 | Nishiwaki et al. | 250/458.1 |
| 7,724,176 B1 * | 5/2010 | Pruett et al. | 342/25 R |
| 2003/0071125 A1 * | 4/2003 | Yoo | 235/454 |
| 2004/0136101 A1 * | 7/2004 | Warren | 359/853 |
| 2004/0160654 A1 * | 8/2004 | Pfefferseder et al. | 359/201 |
| 2004/0169911 A1 * | 9/2004 | Dewa | 359/291 |
| 2004/0218037 A1 * | 11/2004 | Kowel et al. | 348/51 |
| 2004/0227667 A1 | 11/2004 | Sievenpiper | |
| 2005/0104603 A1 * | 5/2005 | Peschmann et al. | 324/637 |
| 2006/0109174 A1 * | 5/2006 | Baharav et al. | 342/179 |
| 2006/0109176 A1 * | 5/2006 | Lee et al. | 343/700 MS |
| 2006/0214833 A1 * | 9/2006 | Baharav et al. | 342/22 |
| 2006/0214834 A1 * | 9/2006 | Baharav et al. | 342/22 |
| 2006/0214835 A1 * | 9/2006 | Lee et al. | 342/22 |
| 2006/0214836 A1 * | 9/2006 | Baharav et al. | 342/22 |
| 2007/0139248 A1 * | 6/2007 | Baharav et al. | 342/22 |
| 2007/0182639 A1 | 8/2007 | Sievenpiper et al. | |
| 2007/0211403 A1 | 9/2007 | Sievenpiper et al. | |
| 2007/0295914 A1 * | 12/2007 | El-Hanany et al. | 250/371 |
| 2008/0079625 A1 * | 4/2008 | Weems et al. | 342/22 |
| 2008/0094296 A1 * | 4/2008 | Lee | 343/754 |

FOREIGN PATENT DOCUMENTS

| | | |
|---|---|---|
| GB | 2422261 A | 7/2006 |
| GB | 2424528 A | 9/2006 |
| JP | 2003198943 A | 7/2003 |

OTHER PUBLICATIONS

Jacobsen et al., "Compression behavior of micro-scale truss structures formed from self-propagating polymer waveguides", Science Direct, Acta Materialia 55 (2007) pp. 6724-6733.

Sievenpiper et al., "Two-Dimensional Beam Steering Using an Electrically Tunable Impedance Surface", IEEE Transactions on Antennas and Propagation, vol. 51, No. 10, Oct. 2003, pp. 2713-2722.

GB Search report for application GB1006681.9 dated Aug. 23, 2010.

* cited by examiner

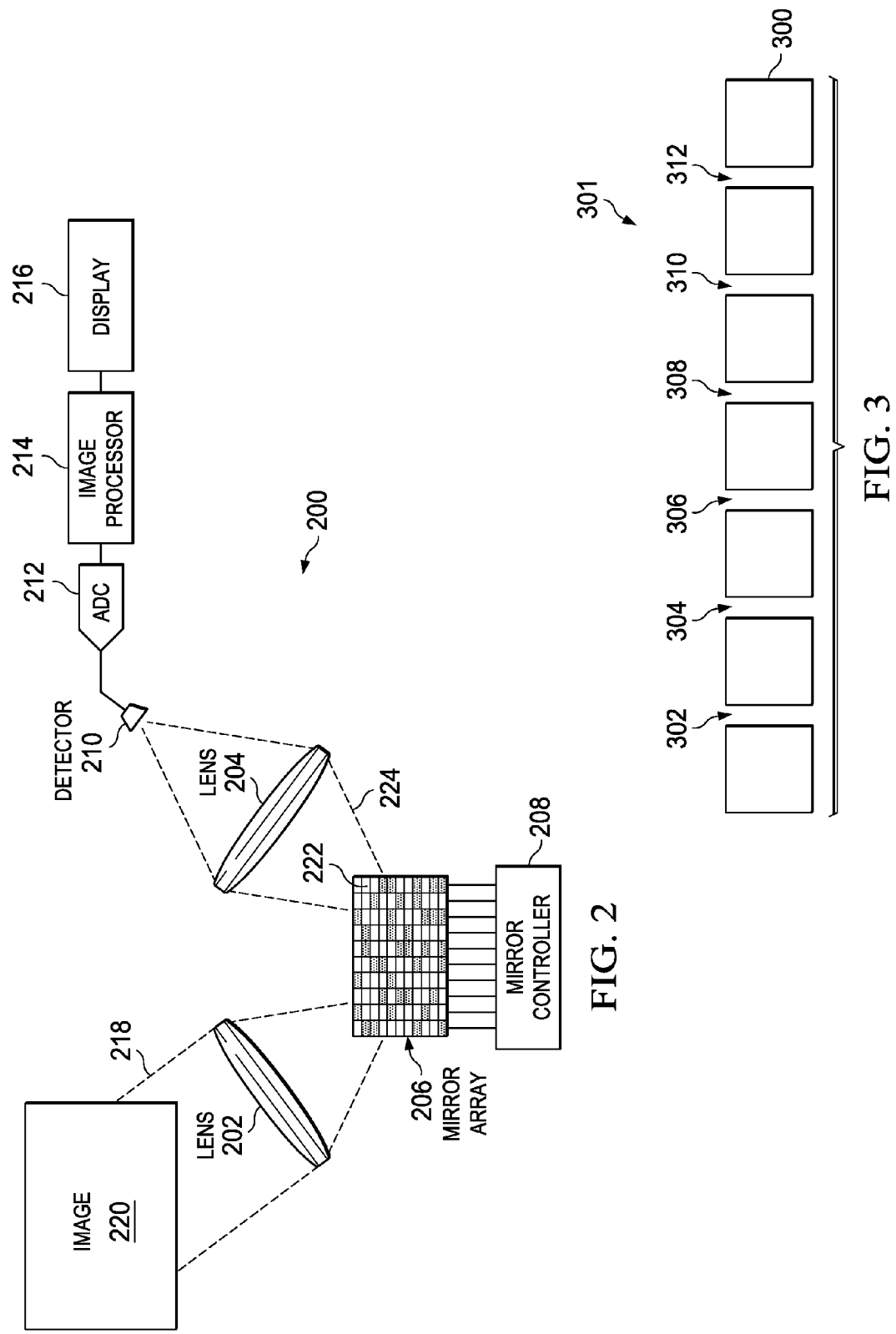

COMPRESSIVE MILLIMETER WAVE IMAGING

BACKGROUND INFORMATION

1. Field

The present disclosure relates generally to imaging and, in particular, to an imaging system using compressive sampling and millimeter waves.

2. Background

Millimeter wave imaging systems have a number of different applications. For example, millimeter wave imaging systems may be used in aircraft landing systems, weapon detection systems, and other suitable applications.

A millimeter wave imaging system operates at millimeter wavelengths. A millimeter wavelength may be from around one millimeter to around ten millimeters. The frequency of millimeter wavelengths may be from around 30 gigahertz to around 300 gigahertz.

Millimeter wave imaging systems may be passive and active. With an active millimeter wave imaging system, the radiation at these wavelengths may have a reduced attenuation over distances of fog or smoke as compared to other wavelengths, such as visible light. As a result, millimeter wave imaging systems have been used to improve visibility through fog for aircraft as part of aircraft landing systems.

Further, millimeter wave imaging systems also are used in security applications to detect hidden weapons and other potential threats. Millimeter waves at millimeter wavelengths are capable of penetrating clothing and significant thicknesses of materials. These materials include, for example, without limitation, dry wood and wall board.

Currently employed millimeter wave imaging systems use a fixed array of detectors, a mechanically scanned detector, or an array of detectors. The different currently available techniques, however, may have drawbacks in cost and/or performance.

For example, with fixed array detectors, a tradeoff between cost and performance is present. Individual detector diodes may be placed at each pixel or array element. The cost for this type of design may be low or reasonable, but a loss of performance occurs with this type of design. The thermal resolution of the discrete diode causes a loss in thermal resolution.

The performance of this type of array may be increased by adding a low noise amplifier to each array element. This performance increase, however, increases the cost and complexity of construction.

In other techniques, a single detector or an array of detectors is used in which the image is scanned across the detector or array of detectors. Desired performance can be obtained without increasing cost. This type of system, however, has an increase in complexity with respect to the mechanical scanning used. Further, with scanning of the image across a detector or array of detectors, an increase in time occurs to generate an image.

Therefore, it would be advantageous to have a method and apparatus that takes into account at least some of the issues discussed above, as well as possibly other issues.

SUMMARY

In one advantageous embodiment, a millimeter wave imaging apparatus comprises a mirror array having a plurality of mirrors, a control system, an image processor, and a display device. The plurality of mirrors is capable of receiving a millimeter wave signal. The control system is capable of controlling a first portion of the plurality of mirrors in the mirror array to direct a first portion of the millimeter wave signal to a detector. The control system is capable of controlling a second portion of the plurality of mirrors in the mirror array to direct a second portion of the signal away from the detector. The control system is also capable of randomly selecting a number of mirrors in the first portion of the plurality of mirrors in the mirror array. The image processor is capable of creating an image using the first portion of the signal detected by the detector. The display device is in communication with the image processor. The image processor is capable of displaying the image on the display device.

In another advantageous embodiment, an apparatus comprises a mirror array having a plurality of mirrors and a control system. The plurality of mirrors is capable of receiving a signal for an image. The control system is capable of controlling a first portion of the plurality of mirrors in the mirror array to direct a first portion of the signal to a detector. The control system is also capable of controlling a second portion of the plurality of mirrors in the mirror array to direct a second portion of the signal away from the detector.

In yet another advantageous embodiment, a method is present for directing a signal. A signal is received at a mirror array having a plurality of mirrors. A first portion of the plurality of mirrors in the mirror array is controlled to direct a first portion of the signal to a detector. A second portion of the plurality of mirrors in the mirror array is controlled to direct a second portion of the signal away from the detector.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 2 is a diagram of a millimeter wave imaging system in accordance with an advantageous embodiment;

FIG. 3 is a cross-sectional view of a substrate for a mirror in accordance with an advantageous embodiment;

DETAILED DESCRIPTION

The different advantageous embodiments recognize and take into account that currently used imaging systems may have increased costs to obtain the desired resolution. Further, the different advantageous embodiments also recognize and take into account that currently used imaging systems may generate an image at a rate that may be slower than desired.

Thus, one or more of the different advantageous embodiments include an apparatus comprising a plurality of mirrors and a control system. The plurality of mirrors is capable of receiving a signal for an image. The control system is capable of controlling the first portion of the plurality of mirrors to direct a first portion of the signal to a detector and is capable of controlling a second portion of the plurality of mirrors to direct a second portion of the signal away from the detector.

Figure 1:
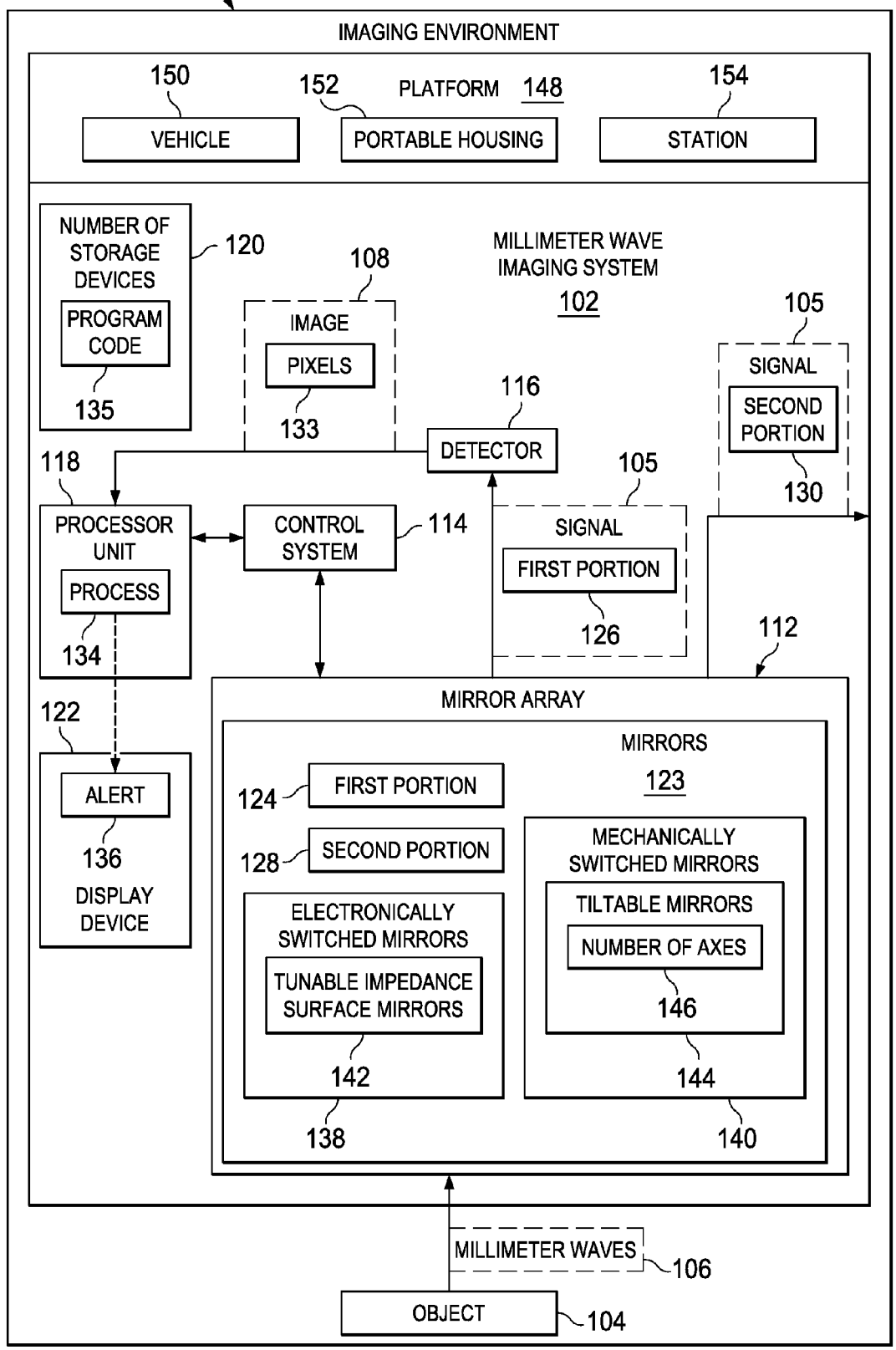
FIG. 1 is a diagram of an imaging environment in accordance with an advantageous embodiment.

With reference now to the figures and, in particular, with reference to FIG. 1, a diagram of an imaging environment is depicted in accordance with an advantageous embodiment. Imaging environment 100 is an example of an environment in which different advantageous embodiments may be implemented.

In this illustrative example, imaging environment 100 includes millimeter wave imaging system 102 and object 104. Millimeter wave imaging system 102 operates using millimeter waves 106. Millimeter waves 106 may be from around one millimeter to around 10 millimeters and may have a frequency from around 30 gigahertz to around 300 gigahertz in these illustrative examples. Millimeter wave imaging system 102 is capable of detecting millimeter waves 106 emanating from object 104.

Millimeter waves 106 may be used to generate image 108, which may be viewed and/or analyzed for various purposes. Image 108 may be used to detect objects that may be hidden by fog and/or smoke in visible light. For example, if object 104 is a landing field, millimeter waves 106 may be used to identify a distance to the landing field, buildings, vehicles, and/or other structures that may be located at the landing field.

Further, image 108 may be used to identify security issues. When object 104 is a person, millimeter waves 106 may be used to generate image 108 to detect whether the person is carrying restricted and/or prohibited items.

In this illustrative example, millimeter wave imaging system 102 includes mirror array 112, control system 114, detector 116, processor unit 118, number of storage devices 120, and display device 122.

In these illustrative examples, processor unit 118 may be a number of processors. A number of items, as used herein, refers to one or more items. Processor unit 118 may be, for example, a number of processors. These processors may be homogeneous or heterogeneous in architecture. Further, processor unit 118 may be a multi-core processor.

Number of storage devices 120 may include, for example, without limitation, a random access memory, a read only memory, a hard disk drive, a solid state disk drive, or some other suitable storage device. In these examples, number of storage devices 120 may be implemented using any device capable of storing information.

Mirror array 112 contains mirrors 123. In these illustrative examples, mirrors 123 are controlled by control system 114. Each mirror in mirrors 123 within mirror array 112 may be separately controlled with respect to other mirrors in mirrors 123 by control system 114.

Control system 114 may control first portion 124 of mirrors 123 to direct first portion 126 of signal 105 to detector 116 while controlling second portion 128 of mirrors 123 to direct second portion 130 of signal 105 away from detector 116.

First portion 124 may have a number of mirrors, while second portion 128 may have a different number of mirrors within mirrors 123. In these examples, different mirrors in mirrors 123 making up first portion 124 may not be contiguous and/or adjacent to other parts of first portion 124. The selection of mirrors that form first portion 124 is performed randomly in these examples.

Further, first portion 124 may change periodically. For example, the selection of mirrors making up first portion 124 from mirrors 123 may change every millisecond, every second, and/or after some other period of time. Further, first portion 124 may be selected based on preset patterns, depending on the particular implementation.

The directing of signal 105 onto detector 116 forms image 108. In these illustrative examples, image 108 is comprised of pixels 133. Each pixel in pixels 133 corresponds to a mirror in first portion 124 of mirrors 123.

In these illustrative examples, process 134 occurs through the execution of program code 135 in a functional form by processor unit 118. Image 108 is processed by process 134.

Image 108 may then be displayed on display device 122 and/or stored within number of storage devices 120.

Further, process 134 also may analyze image 108. For example, process 134 may analyze image 108 to identify objects within image 108. As yet another example, process 134 may include facial recognition functions to identify people that may be present in image 108. Process 134 also may generate alert 136, which also may be displayed on display device 122 and/or stored in number of storage devices 120. Further, alert 136 may be transmitted to an operator or other person.

In the different advantageous embodiments, mirrors 123 may be implemented in a number of different ways. For example, mirrors 123 may be electronically switched mirrors 138, mechanically switched mirrors 140, and/or some other suitable type of mirror system. Electronically switched mirrors 138 are mirrors capable of directing signal 105 without mechanical movement and may take the form of tunable impedance surface mirrors 142 in the depicted examples. Tunable impedance surface mirrors 142 may be individually adjusted to have a different impedance. The different impedance may be used to control first portion 124 of mirrors 123 to direct first portion 126 of signal 105 to detector 116 and control second portion 128 of mirrors 123 to direct second portion 130 of signal 105 away from detector 116.

Mechanically switched mirrors 140 are mirrors that are capable of directing signal 105 through physical movement and take the form of tiltable mirrors 144 in these illustrative examples. Tiltable mirrors 144 may be physically tilted along number of axes 146. This tilting may be controlled in a fashion such that first portion 124 of mirrors 123 directs first portion 126 of signal 105 to detector 116 and second portion 128 of mirrors 123 directs second portion 130 of signal 105 away from detector 116.

In these illustrative examples, millimeter wave imaging system 102 may be located on or in platform 148. Platform 148 may be, for example, without limitation, vehicle 150, portable housing 152, station 154, or some other suitable type of platform. For example, platform 148 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a station, and a portable housing.

The illustration of imaging environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, millimeter wave imaging system 102 also may include a transmitter to transmit a signal to obtain signal 105 as a response. In yet other advantageous embodiments, millimeter wave imaging system 102 may be a passive millimeter wave imaging system. With this type of system, signal 105 may be emitted by the object and/or obtained from other sources of millimeter waves that may occur within imaging environment 100.

As yet another example, in some advantageous embodiments, additional mirrors, in addition to mirrors 123, may be present to receive a signal, in addition to signal 105, to perform imaging from more than one source.

Turning now to FIG. 2, a diagram of a millimeter wave imaging system is depicted in accordance with an advantageous embodiment. In this illustrative example, millimeter wave imaging system 200 is an example of one implementation for millimeter wave imaging system 102 in FIG. 1. Millimeter wave imaging system 200 includes lens 202, lens 204, mirror array 206, mirror controller 208, detector 210, analog-to-digital converter 212, image processor 214, and display 216.

In this illustrative example, lens 202 receives and directs signal 218 for image 220 onto mirrors 222 in mirror array 206. Mirrors 222 are capable of redirecting signal 218. Signal 218 takes the form of millimeter waves in these examples.

Mirror array 206 redirects a portion of signal 218 as redirected signal 224 through lens 204 onto detector 210. Redirected signal 224 is then converted into a digital signal by analog-to-digital converter 212. This digital signal is processed by image processor 214 to generate an image for presentation on display 216.

In these illustrative examples, only a portion of signal 218 is directed onto detector 210. A second portion is directed away from detector 210. These different portions are non-contiguous in these examples. Mirrors 222 are randomly selected to direct the first portion of signal 218 onto detector 210 while directing the rest of signal 218 away from detector 210. This control of mirrors 222 within mirror array 206 may occur on a periodic basis.

The redirection of mirrors 222 in mirror array 206 may take from around ten milliseconds to around one millisecond, depending on the particular implementation. Of course, other time periods may be present depending on the particular design of mirrors 222 and/or mirror controller 208.

Turning now to FIGS. 3-13, diagrams illustrating fabrication of a mirror having an electronically tunable impedance surface is depicted in accordance with an advantageous embodiment. In particular, these diagrams illustrate the fabrication of a tunable impedance surface mirror that may be used to implement tunable impedance surface mirrors 142 in FIG. 1.

Turning to FIG. 3, a cross-sectional view of a substrate for a mirror is depicted in accordance with an advantageous embodiment. Substrate 300 forms a base or substrate for mirror 301 in these illustrative examples. In these illustrative examples, substrate 300 is selected as a substrate for mirror 301 that has an electronically tunable impedance surface.

In this illustrative example, substrate 300 may be selected from a number of different materials. For example, without limitation, substrate 300 may be aluminum, quartz, a Rogers R0 3003 material, or some other suitable type of material.

In these illustrative examples, the material selected for substrate 300 is selected as one having a millimeter wave loss at the selected frequency that is equal to or less than some selected amount. Substrate 300 may have different thicknesses, depending on the particular implementation. In these illustrative examples, substrate 300 may have a thickness from around 5 millimeters to around 10 millimeters.

In these illustrative examples, holes 302, 304, 306, 308, 310, and 312 are drilled through substrate 300. These holes may be drilled using a laser or a drill bit. Holes 302, 304, 306, 308, 310, and 312 may have various sizes. In these illustrative examples, these holes may be around one quarter of a millimeter in diameter.

Figure 4:
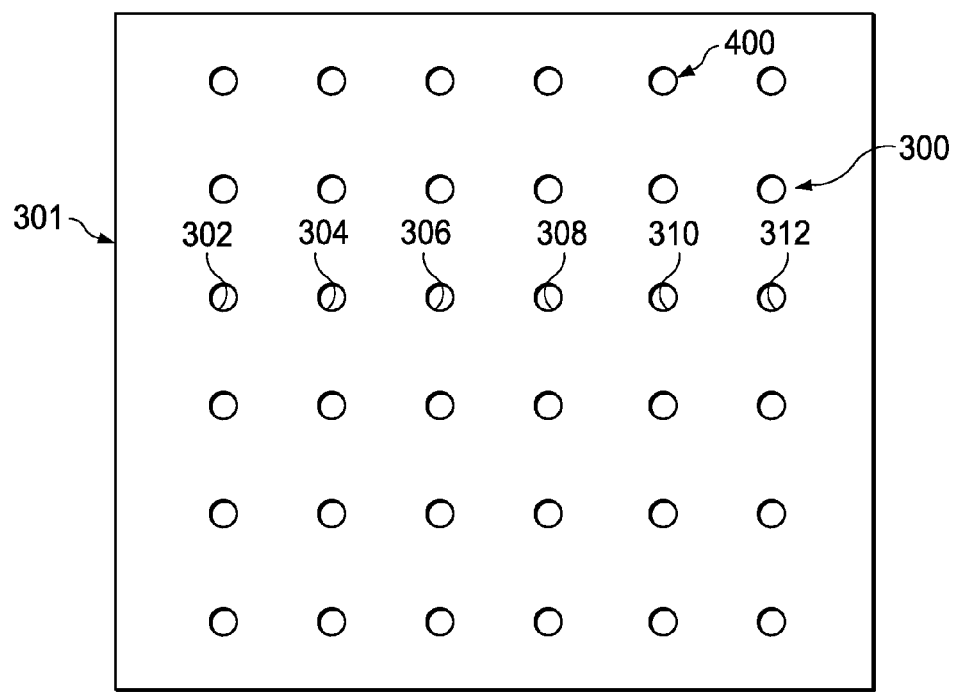
FIG. 4 is a plan view of a substrate for a mirror in accordance with an advantageous embodiment.

Turning now to FIG. 4, a plan view of substrate 300 for mirror 301 is depicted in accordance with an advantageous embodiment. In this illustrative example, mirror 301 has plurality of holes 400 drilled into substrate 300. As depicted in this illustrative example, plurality of holes 400 is arranged in a six by six matrix of holes in substrate 300. Holes 302, 304, 306, 308, 310, and 312 form one row of holes within this array.

Figure 5:
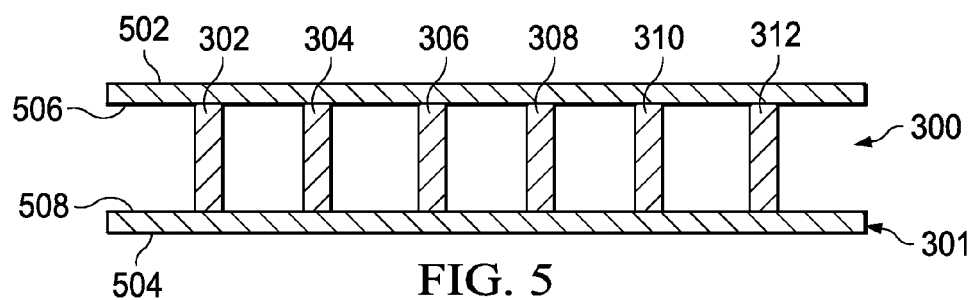
FIG. 5 is a cross-sectional view illustrating metallization of a substrate in accordance with an advantageous embodiment.

Turning next to FIG. 5, a cross-sectional view illustrating metallization of a substrate is depicted in accordance with an advantageous embodiment. In this illustrative example, metal layer 502 and metal layer 504 are formed on surface 506 and surface 508 of substrate 300. Additionally, metal layer 502 and metal layer 504 extend through holes 302, 304, 306, 308, 310, and 312 in these illustrative examples. Metal layers 502 and 504 may have a thickness of around 5 micrometers to around 10 micrometers in these illustrative examples.

The metal layers illustrated in FIG. 5 may be deposited onto surfaces 506 and 508 of substrate 300 and into holes 302, 304, 306, 308, 310, and 312 through various processes. For example, the metal may be deposited using sputtering and/or evaporation. In these illustrative examples, the metal used in metal layers 502 and 504 and in holes 302, 304, 306, 308, 310, and 312 may be selected from a number of different materials. For example, the metal may be gold, silver, copper, or some other suitable material. In these examples, the metal is selected as one that meets a desired level of conductivity. In these illustrative examples, the conductivity is high enough to conduct signals.

Figure 6:
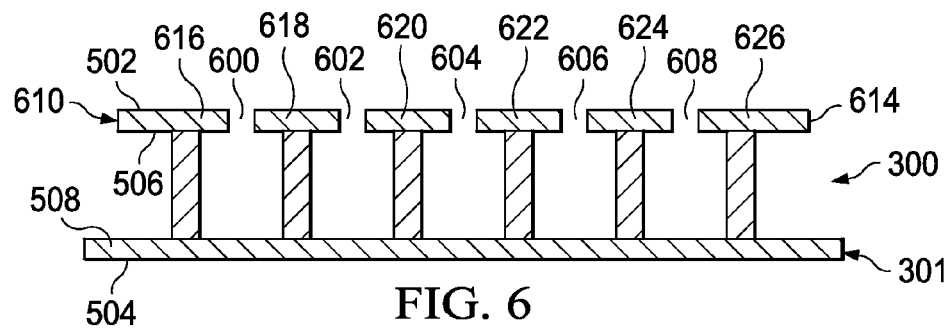
FIG. 6 is a cross-sectional view illustrating creation of patches in accordance with an advantageous embodiment.

Turning now to FIG. 6, a cross-sectional view illustrating creation of patches is depicted in accordance with an advantageous embodiment. Metal layer 502 is patterned and etched to create channels 600, 602, 604, 606, and 608. Further, edges 610 and edges 614 are created in which surface 506 is exposed at these edges and channels. This patterning and etching of metal layer 502 forms patches 616, 618, 620, 622, 624, and 626. This patterning may be performed through currently available optical lithographic techniques to define a pattern and photo resist. The edges and channels are then created by etching away metal in exposed portions of the photo resists.

Figure 7:
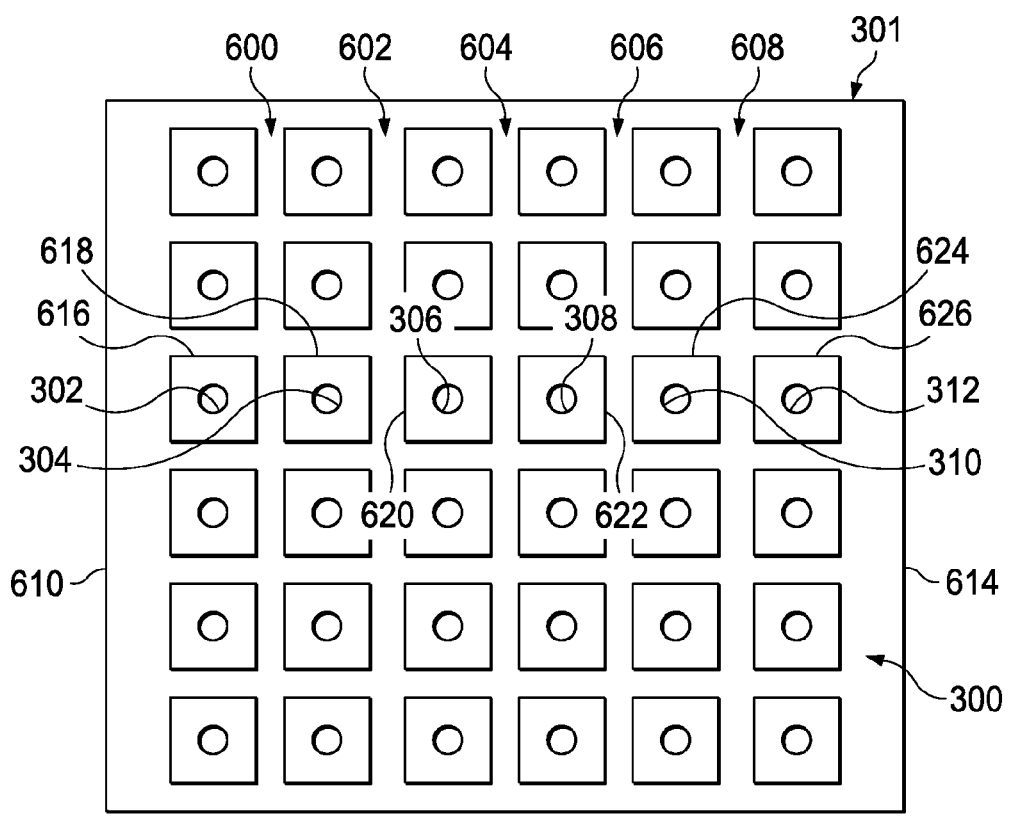
FIG. 7 is a plan view of patches in a mirror in accordance with an advantageous embodiment.

With reference now to FIG. 7, a plan view of patches in a mirror is depicted in accordance with an advantageous embodiment. In this illustrative example, a six by six array of patches is illustrated for mirror 301.

Figure 8:
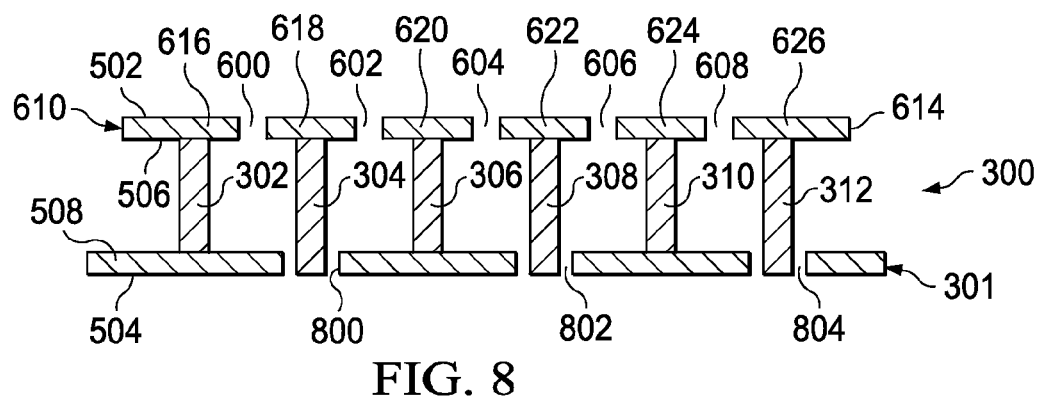
FIG. 8 is a cross-sectional view illustrating patterning of a substrate for a mirror in accordance with an advantageous embodiment.

Turning now to FIG. 8, a cross-sectional view illustrating patterning of a substrate for a mirror is depicted in accordance with an advantageous embodiment. In this illustrative example, metal layer 504 on surface 508 is patterned and etched to create contacts 800, 802, and 804. In these illustrative examples, a contact is made for every other hole in a row and a column of holes in substrate 300. Contacts 800, 802, and 804 may be created by patterning and etching metal layer 504 on surface 508.

Figure 9:
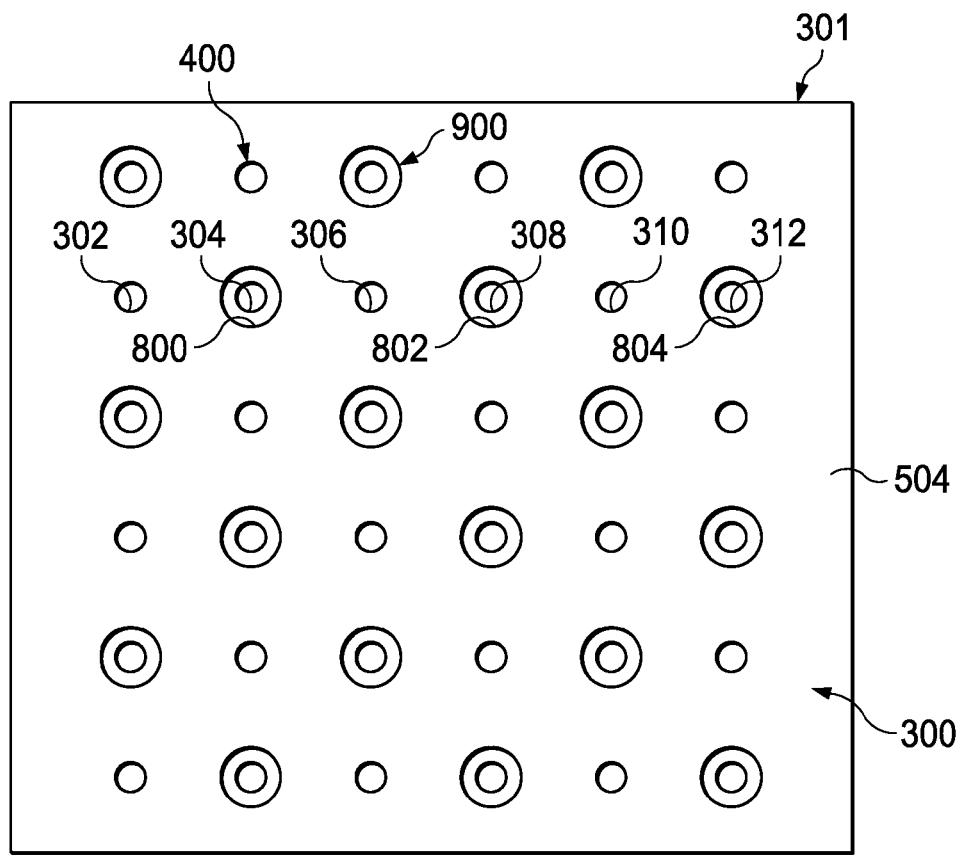
FIG. 9 is a plan view of contacts on a substrate in accordance with an advantageous embodiment.

In FIG. 9, a plan view of contacts on substrate 300 is depicted in accordance with an advantageous embodiment. Plurality of holes 400 is arranged in a six by six array of holes drilled into substrate 300. In this illustrative example, plurality of holes 400 has contacts 900 for every other hole in the rows and columns of the six by six array of plurality of holes 400. For example, in one row of plurality of holes 400, contacts 800, 802, and 804 are made for holes 304, 308, and 312. Holes 304, 308, and 312 may be every other hole in the row for holes 302, 304, 306, 308, 310, and 312.

Figure 10:
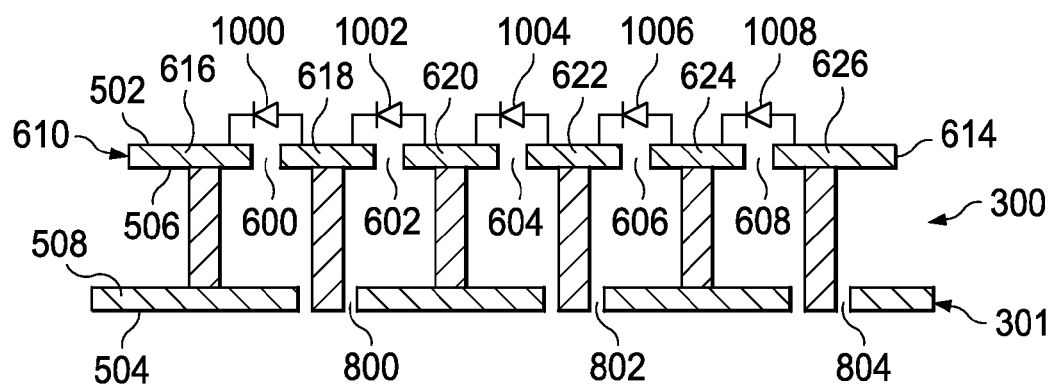
FIG. 10 is a cross-sectional view illustrating diodes on a substrate in accordance with an advantageous embodiment.

With reference next to FIG. 10, a cross-sectional view illustrating diodes on a substrate is depicted in accordance with an advantageous embodiment. In FIG. 10, varactor diodes 1000, 1002, 1004, 1006, and 1008 are attached to metal layer 502 in an alternating pattern. A varactor diode is a type of diode that has a variable capacitance that is a function of the voltage applied across the terminals of the diode.

In these illustrative examples, varactor diodes 1000, 1002, 1004, 1006, and 1008 may be attached to metal layer 502 through a number of different mechanisms. For example, the attachment may be solder, conducting epoxy, gap welding, or some other suitable form of attachment.

Figure 11:
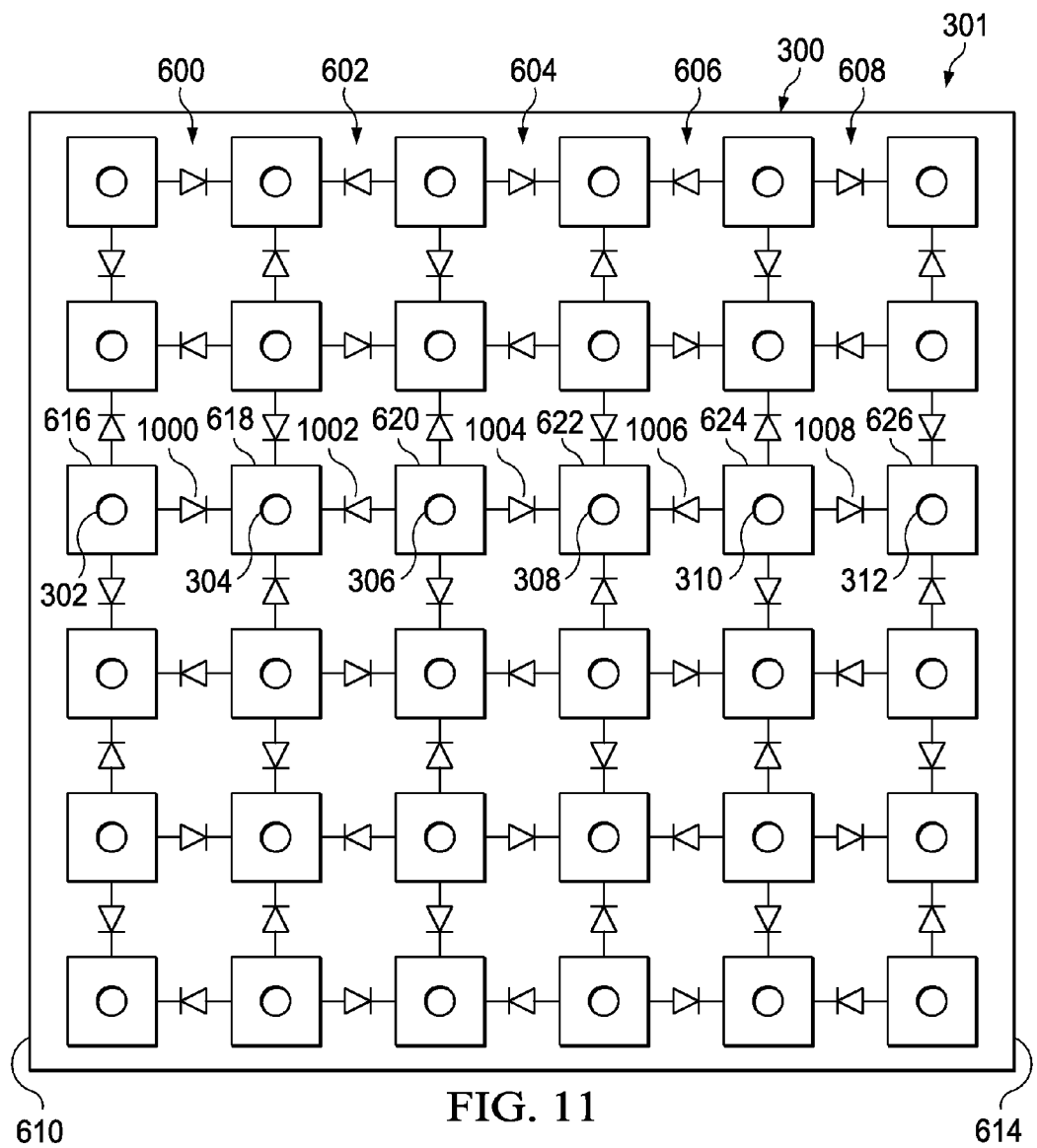
FIG. 11 is a plan view of a substrate for a mirror in accordance with an advantageous embodiment.

Turning now to FIG. 11, a plan view of a substrate for a mirror is depicted in accordance with an advantageous embodiment. This top view of substrate 300 for mirror 301 provides an illustration of the alternating pattern for varactor diodes on substrate 300 for the different patches.

Figure 12:
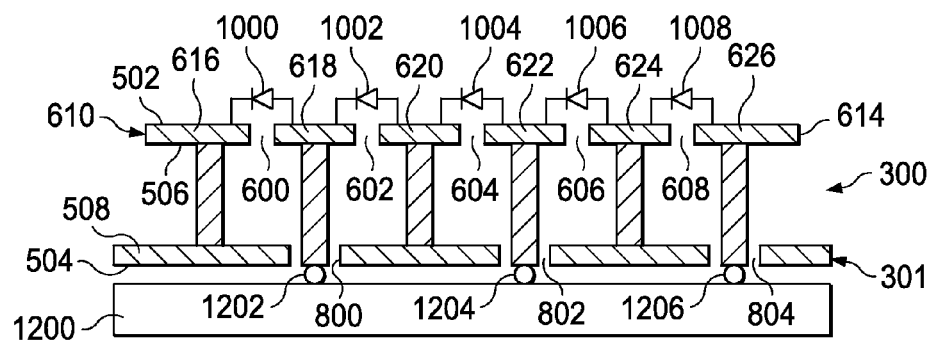
FIG. 12 is a cross-sectional view illustrating attachment of a bias board to a substrate of a mirror in accordance with an advantageous embodiment.

Turning now to FIG. 12, a cross-sectional view illustrating attachment of a bias board to a substrate of a mirror is depicted in accordance with an advantageous embodiment. In this illustrative example, bias board 1200 is electrically connected to contacts 800, 802, and 804 through connectors 1202, 1204, and 1206. Bias board 1200 may be used to apply different electrical voltages to varactor diodes mounted on patches 616, 618, 620, 622, 624, and 626 in this illustrative example.

Bias board 1200 may be attached to contacts 1202, 1204, and 1206 through a number of different mechanisms. For example, without limitation, these connections may be by epoxy, solder, mechanical compression, or some other suitable type of attachment mechanism.

Different bias voltages may be applied to connectors 1202, 1204, and 1206 to change the impedance on the different patches for mirror 301. The change in impedance for the different patches may be performed to steer or direct a millimeter wave signal in a selected direction of mirror 301.

Figure 13:
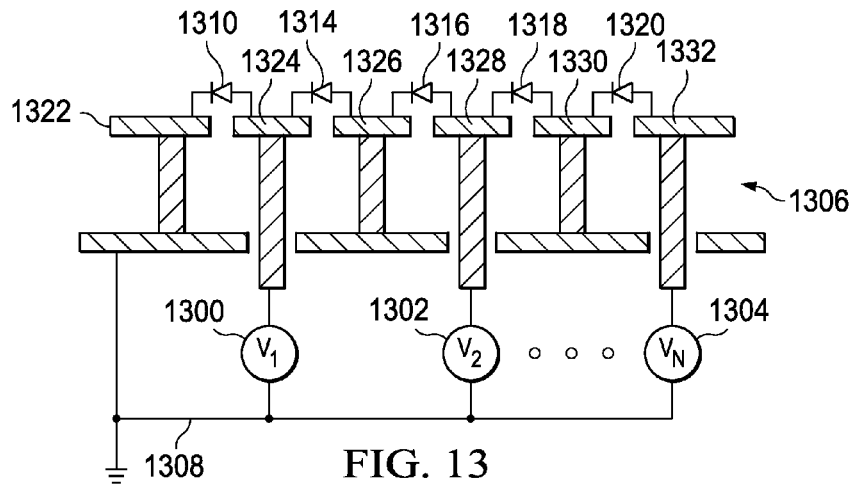
FIG. 13 is a schematic diagram of a portion of a mirror in accordance with an advantageous embodiment.

Turning now to FIG. 13, a schematic diagram of a portion of a mirror is depicted in accordance with an advantageous embodiment. This schematic diagram illustrates the application of bias voltages to a cross-section of substrate 300 for mirror 301.

In this example, bias voltages 1300, 1302, and 1304 may be applied to mirror 1306 through bias board 1308. The application of these voltages passes through varactor diodes 1310, 1314, 1316, 1318, and 1320 connecting patches 1322, 1324, 1326, 1328, 1330, and 1332. The change in impedance for these different patches is performed to direct a millimeter wave signal received at mirror 1306 to a desired direction, such as toward a detector or away from a detector.

With reference now to FIGS. 14-24, diagrams illustrating fabrication of a mirror capable of being physically tilted is depicted in accordance with an advantageous embodiment. The fabrication processes and diagrams illustrated in these figures may be used to fabricate a tiltable mirror in tiltable mirrors 144 in FIG. 1. In these illustrative examples, the mirrors include a microtruss for the structure in which the reflective surfaces are fabricated. The microtruss may reduce the weight of the mirrors and may increase the strength of the mirrors.

A microtruss structure is a structure having elongate members that interconnect at nodes. These elongate members are also referred to as polymer waveguides. A microtruss structure may be formed from a three-dimensional pattern of interconnected self-propagating polymer waveguides. These polymer waveguides may be set up through the use of a mask with apertures exposed to multiple collimated light beams. These collimated light beams may be directed at the mask from different directions to form the polymer waveguides that interconnect at nodes. The nodes and waveguides form octahedral shaped cells in these illustrative examples.

Microtruss structures may have various sizes, depending on the particular implementation. For example, microtruss structures may be around 7.8 millimeters in height.

Figure 14:
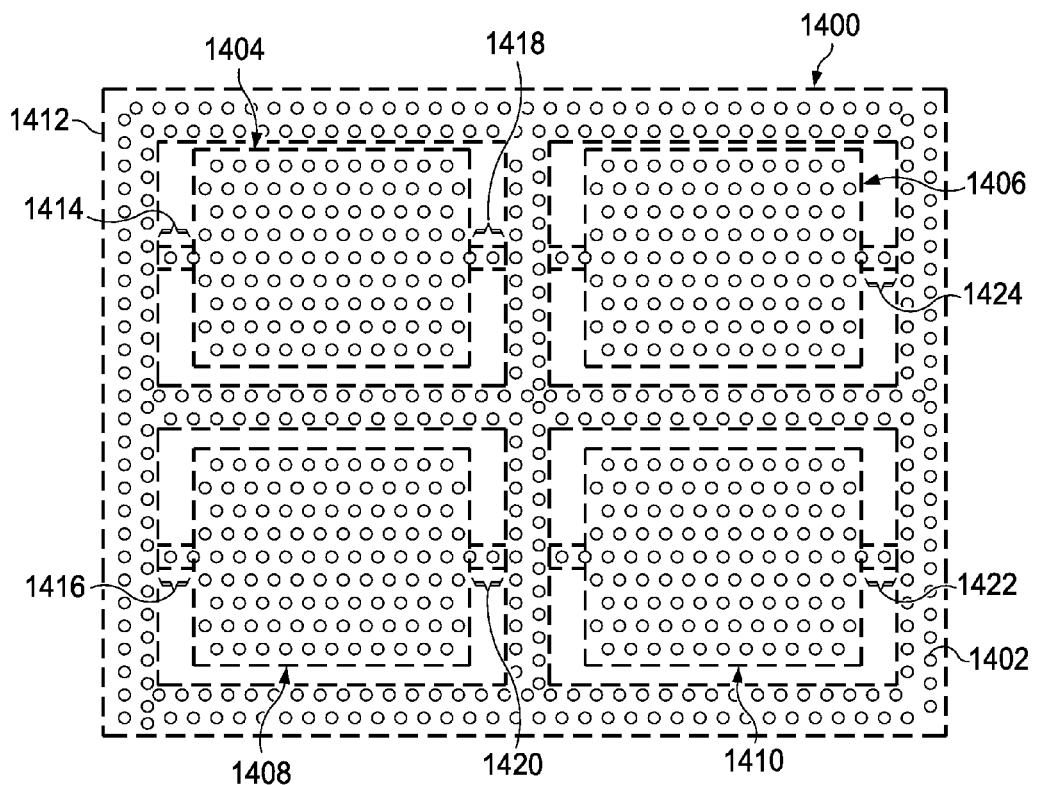
FIG. 14 is a plan view of a photomask for a mirror in accordance with an advantageous embodiment.

Turning now to FIG. 14, a plan view of a photomask for a mirror is depicted in accordance with an advantageous embodiment. Photomask 1400 has holes 1402 that are used to form a microtruss structure.

In this illustrative example, each array of holes forms a mirror. For example, holes 1402 in sections 1404, 1406, 1408, and 1410 each forms a mirror. Holes 1402 around perimeter 1412 may be for a support structure for the mirrors. Holes 1402 in sections 1414, 1416, 1418, 1420, 1422, and 1424 may be used to form torsion beams for the mirrors. Holes in sections 1404, 1406, 1408, and 1410 form mirrors.

Photomask 1400 is only provided for purposes of illustration and does not illustrate the actual density of holes. The actual hole density is greater for the photomask. Further, in this illustrative example, photomask 1400 only contains a pattern for four mirrors. Of course, in the different advantageous embodiments, other numbers of mirrors may be present in photomask 1400. For example, photomask 1400 may be implemented to have patterns for 64 mirrors, 128 mirrors, and/or some other suitable number of mirrors. Although four mirrors are shown in this illustrative example, other numbers of mirrors may be used, depending on the particular implementation.

Figure 15:
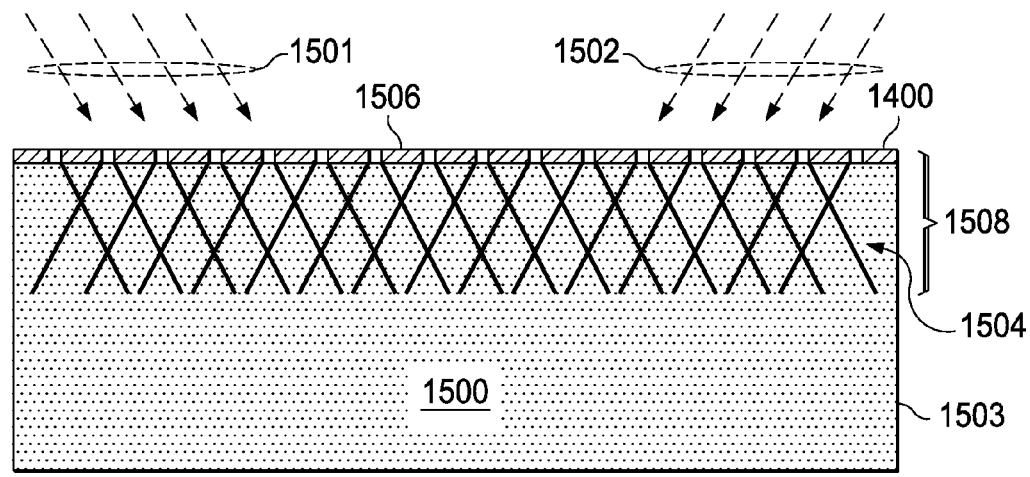
FIG. 15 is a cross-sectional view illustrating fabricating a microtruss structure in accordance with an advantageous embodiment.

Turning now to FIG. 15, a cross-sectional view illustrating fabricating a microtruss structure is depicted in accordance with an advantageous embodiment. In this cross-sectional view, photomask 1400 is placed over polymer solution 1500 in container 1503. Collimated ultraviolet light sources are used to direct ultraviolet light 1501 and ultraviolet light 1502 onto photomask 1400.

The exposure of polymer solution 1500 to ultraviolet light 1501 and ultraviolet light 1502 creates microtruss structure 1504. In these illustrative examples, ultraviolet light 1501 and ultraviolet light 1502 may have an equal incident angle off of surface 1506 of photomask 1400. Ultraviolet light 1501 and ultraviolet light 1502 may be collimated beams that are rotated around 90 degrees about the normal for surface 1506 of photomask 1400.

In these examples, the exposure time to ultraviolet light 1501 and ultraviolet light 1502 is around 36 seconds with an exposure fluence of around 7.5 milliwatts per centimeter squared per each collimated beam.

In this example, microtruss structure 1504 may have thickness 1508. Thickness 1508 may be a function of the depth of polymer solution 1500. In these examples, the cells within microtruss structure 1504, the thickness, and the area may be controlled through the design of photomask 1400, the orientation of ultraviolet light 1501 and ultraviolet light 1502, and the amount of polymer solution 1500 within container 1503.

Further, although two collimated beams are shown in these illustrative examples, other numbers of collimated beams may be employed. For example, three, four, five, or some other number of collimated beams may be projected onto photomask 1400, depending on the particular implementation. As seen in this example, photomask 1400 is similar in configuration to photomask 1400 in FIG. 14.

Figure 16:
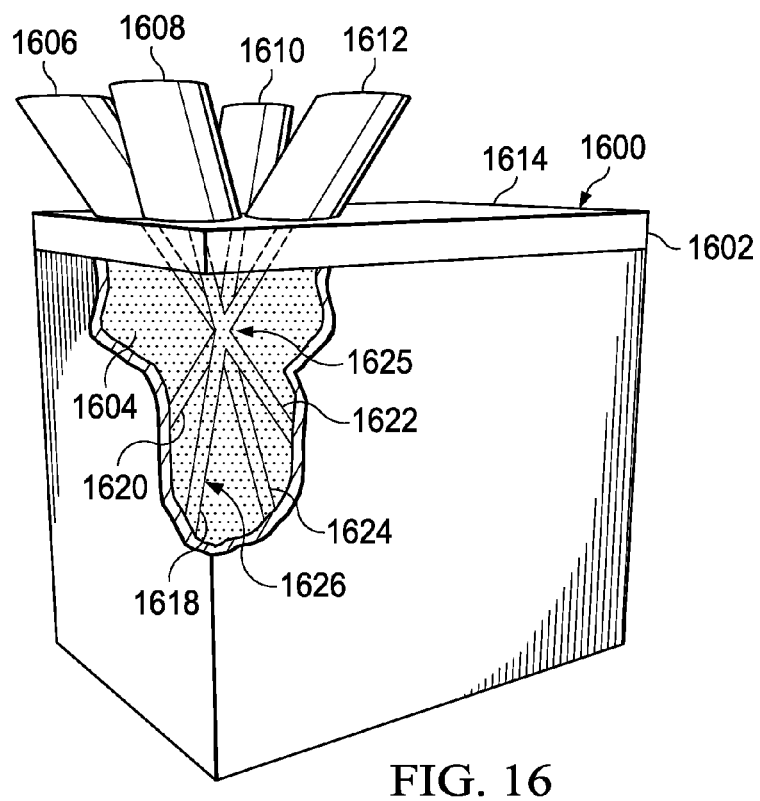
FIG. 16 is a plan view illustrating a microtruss structure in accordance with an advantageous embodiment.

Turning now to FIG. 16, a diagram illustrating an implementation of a portion of a microtruss structure is depicted in accordance with an advantageous embodiment. In this illustrative example, mask 1600 and quartz layer 1602 are placed over polymer solution 1604. Polymer solution 1604 may be any polymer solution capable of becoming solid when exposed to ultraviolet light in these illustrative examples. For example, thiol-ene monomer mixed with 0.05 weight percent 2,2-dimethoxy-2-phenylacetophenone as a photoinitiator may be used as a polymer solution.

In this illustrative example, collimated ultraviolet light beams 1606, 1608, 1610, and 1612 are directed onto surface 1614 of mask 1600. These collimated light beams are directed onto surface 1614 of mask 1600 at equal incident angles off of surface 1614. These different collimated light beams are rotated around 90 degrees about the mask normal. These collimated light beams pass through four apertures in mask 1600.

These four collimated beams form polymer waveguides 1618, 1620, 1622, and 1624 in polymer solution 1604. These polymer waveguides intersect to form node 1625. These polymer waveguides are elongate members for microtruss structure 1626. In this illustrative example, only one node and one set of waveguides are illustrated to depict the structure that is present in microtruss structure 1626. Of course, microtruss structure 1626 includes additional nodes and elongate members that are not shown in this example. This pattern repeats in these examples to form cells. The cells have octahedral shapes in these depicted examples.

Figure 17:
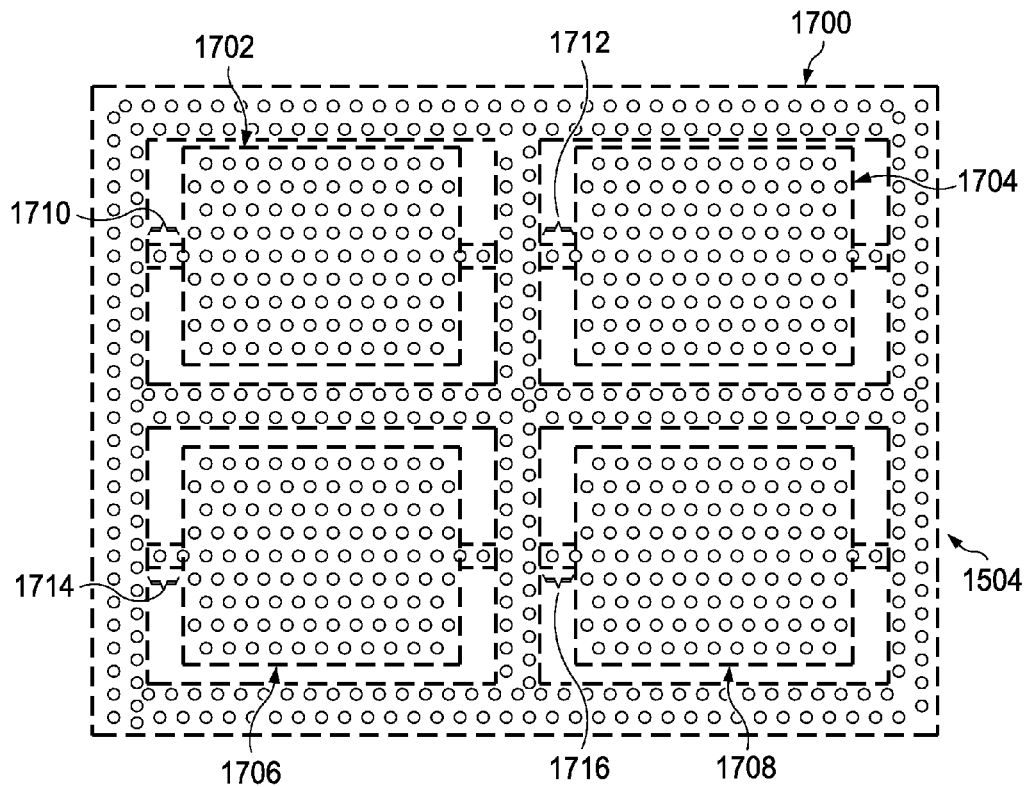
FIG. 17 is a plan view of a photomask for a mirror surface in accordance with an advantageous embodiment.

Turning now to FIG. 17, a plan view illustrating a microtruss structure is depicted in accordance with an advantageous embodiment. Microtruss structure 1504 is depicted in a plan view in this example. Microtruss structure 1504 is the resulting structure from exposure to ultraviolet light 1501 and ultraviolet light 1502 onto photomask 1400 in FIG. 15. As can be seen in this illustrative example, microtruss structure 1504 includes structures for support 1700, mirror 1702, mirror 1704, mirror 1706, mirror 1708, torsion beam 1710, torsion beam 1712, torsion beam 1714, and torsion beam 1716.

Figure 18:
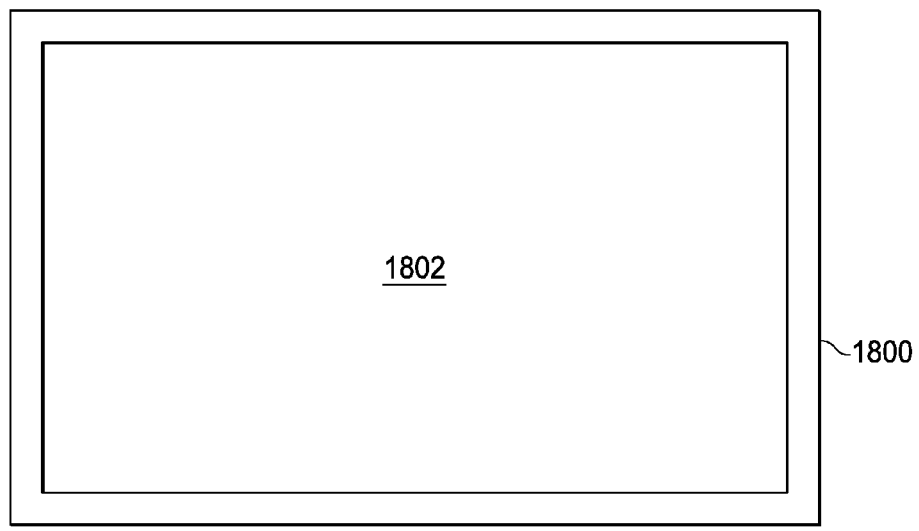
FIG. 18 is a cross-sectional view illustrating fabrication of a mirror base in accordance with an advantageous embodiment.

Turning now to FIG. 18, a plan view of a photomask for a mirror surface is depicted in accordance with an advantageous embodiment. Photomask 1800 is shown in a plan view. In this illustrative example, photomask 1800 is an example of a photomask that may be used to create a mirror surface for the mirror.

In this illustrative example, photomask 1800, however, is made of a metal, such as titanium, aluminum, and/or some other suitable metal. The use of a metal is employed in this particular illustrative example because the mask may become part of the mirror array.

In this illustrative example, photomask 1800 has hole 1802 for the surface of the mirror.

Figure 19:
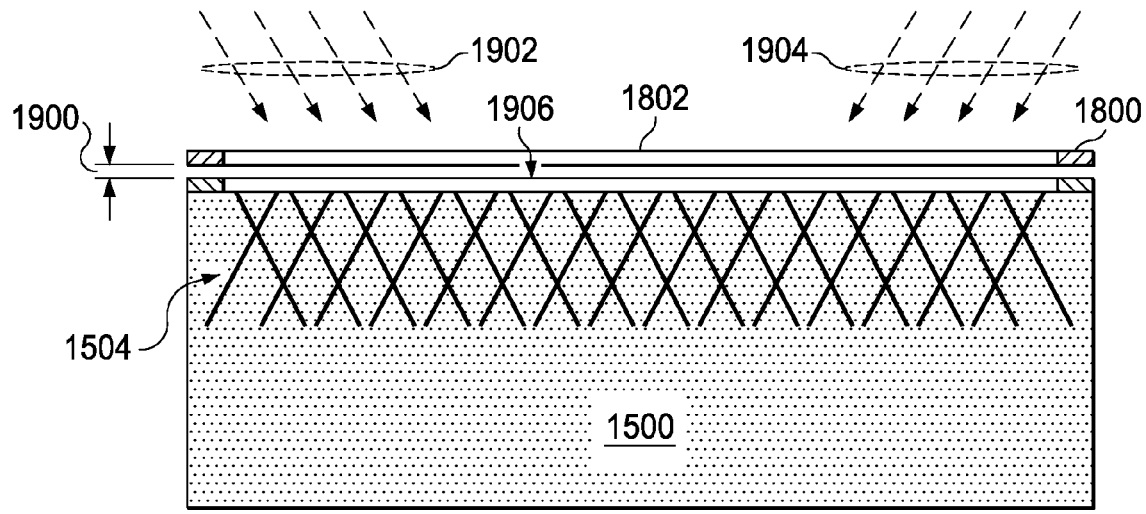
FIG. 19 is a cross-sectional view illustrating metalizing a mirror base in accordance with an advantageous embodiment.

Turning now to FIG. 19, a cross-sectional view illustrating fabrication of a mirror base is depicted in accordance with an advantageous embodiment. In this illustrative example, a cross-sectional side view of microtruss structure 1504 is illustrated in polymer solution 1500 at depth 1900.

Photomask 1800 is placed over microtruss structure 1504 in polymer solution 1500. Collimated ultraviolet light sources direct ultraviolet light 1902 and ultraviolet light 1904 at angles to each other onto photomask 1800. Mirror base 1906 is formed on microtruss structure 1504 where ultraviolet lights 1902 and 1904 pass through hole 1802 in photomask 1800. In particular, mirror base 1906 is formed by polymer solution 1500 located at depth 1900 above microtruss structure 1504.

Mirror base 1906 may have various thicknesses. For example, without limitation, mirror base 1906 may be around or greater than 200 nanometers. Mirror base 1906 may be formed using materials such as, for example, without limitation, aluminum, gold, silver, and/or some other suitable material capable of reflecting signals.

Figure 20:
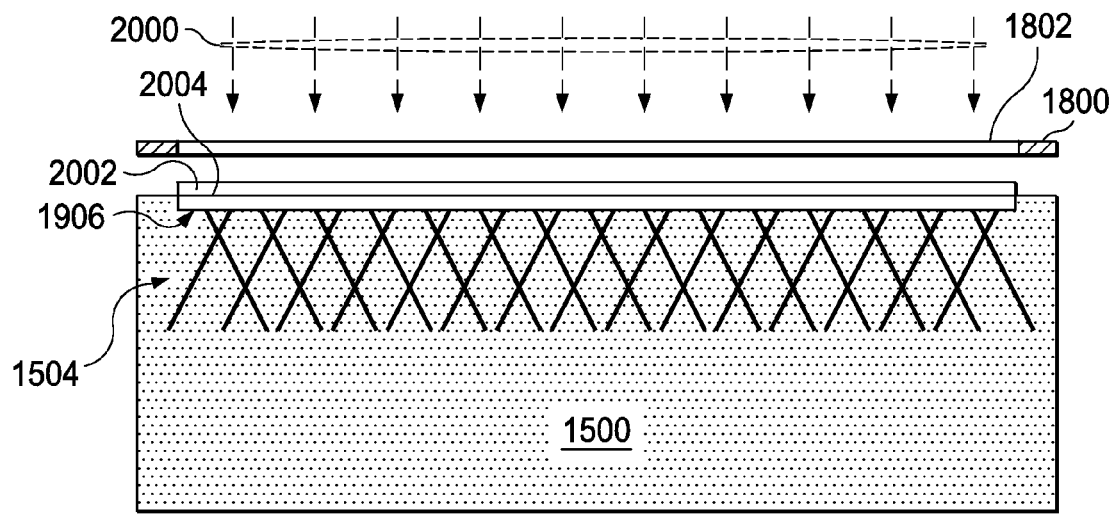
FIG. 20 is a cross-sectional view illustrating the fabrication of a base on a microtruss structure in accordance with an advantageous embodiment.

Turning now to FIG. 20, a cross-sectional view illustrating metalizing a mirror base is depicted in accordance with an advantageous embodiment. Metal 2000 on surface 2002 of mirror base 1906 is depicted. The deposit of metal 2000 forms metal layer 2004 on surface 2002 of mirror base 1906.

Metal layer 2004, in these illustrative examples, may have a thickness of around 200 or more nanometers. In these illustrative examples, metal layer 2004 may be comprised of a number of different types of materials. For example, without limitation, gold, silver, aluminum, and/or some other suitable material may be used. The material selected is one capable of reflecting a millimeter wave in these examples. The deposit of metal 2000 may be performed using a number of different processes, such as sputtering, evaporation, or some other suitable process.

Figure 21:
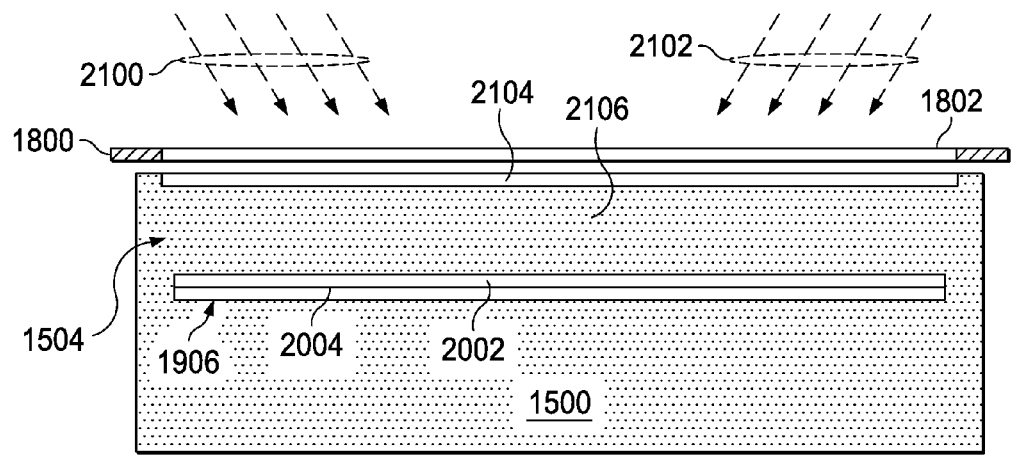
FIG. 21 is a plan view of a photomask for an electrode in accordance with an advantageous embodiment.

Turning now to FIG. 21, a cross-sectional view illustrating the fabrication of a base on a microtruss structure is depicted in accordance with an advantageous embodiment. In this illustrative example, microtruss structure 1504 is turned over as depicted.

Ultraviolet lights 2100 and 2102 are directed onto photomask 1800. Base 2104 is formed on bottom side 2106 of microtruss structure 1504 in this illustrative example. Base 2104 is substantially parallel to mirror base 1906 on which metal layer 2004 is present.

Figure 22:
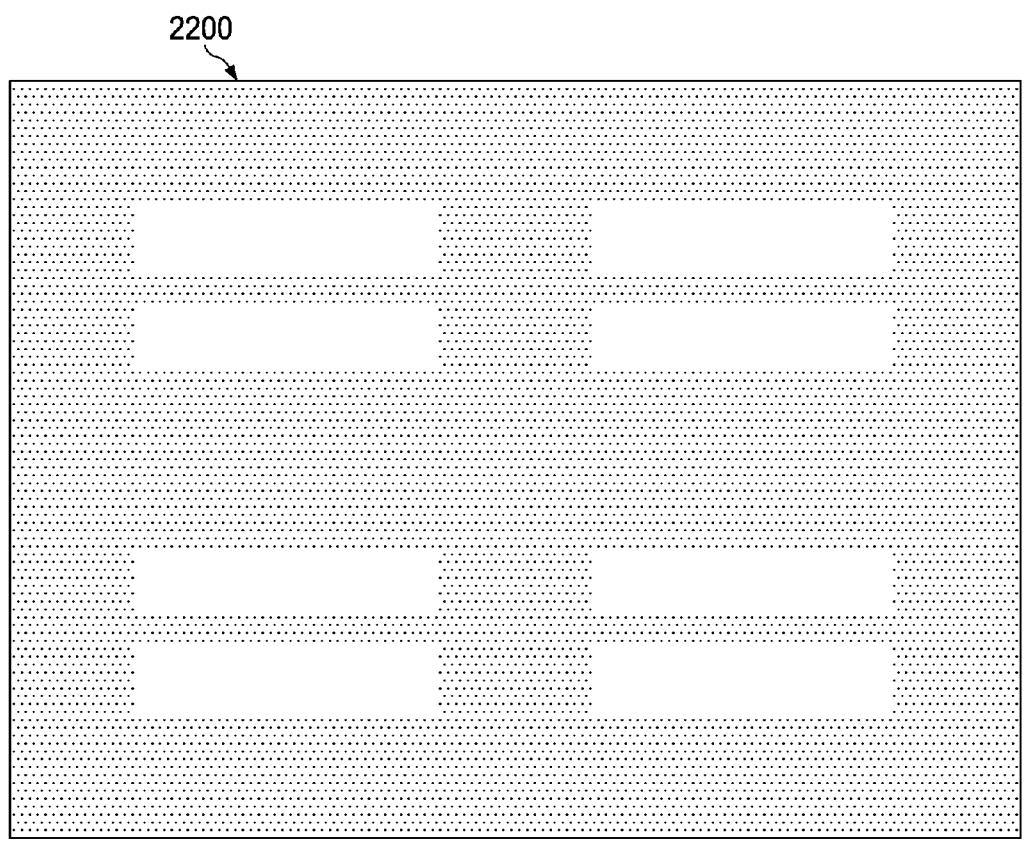
FIG. 22 is a cross-sectional view illustrating the fabrication of electrodes on a base for a mirror in accordance with an advantageous embodiment.

Turning now to FIG. 22, a plan view of a photomask for an electrode is depicted in accordance with an advantageous embodiment. Photomask 2200 is shown in a plan view. In this illustrative example, photomask 2200 is a photomask that may be used to form an electrode on base 2104 in FIG. 21 for a mirror.

Figure 23:
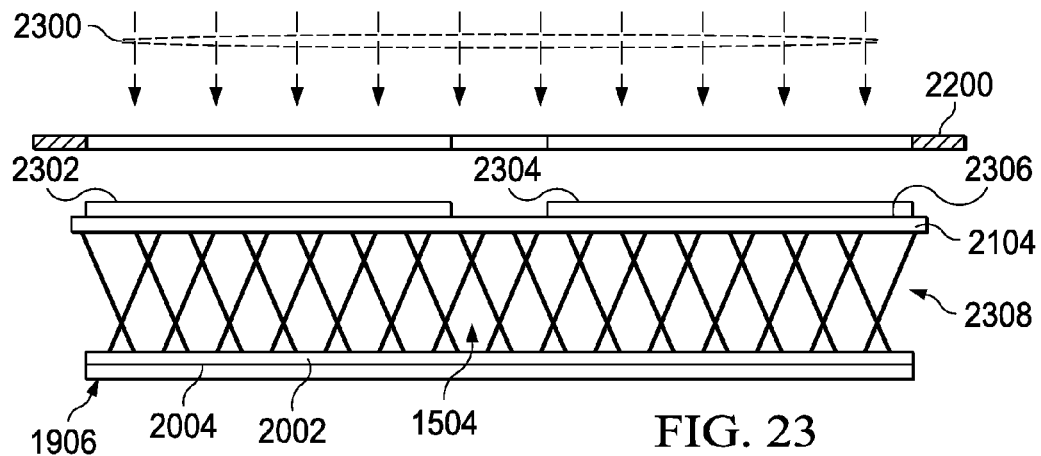
FIG. 23 is a cross-sectional view of a mirror structure on a bias board and support structure in accordance with an advantageous embodiment.

With reference to FIG. 23, a cross-sectional view illustrating the fabrication of electrodes on a base for a mirror is depicted in accordance with an advantageous embodiment. In this illustrative example, metal 2300 is selectively deposited onto base 2104 using photomask 2200. The deposition of metal 2300 through photomask 2200 forms electrode 2302 and electrode 2304 on surface 2306 of base 2104. Metal 2300 may be selected from various materials. Metal 2300 is selected as a material capable of conducting an electrical signal. In this illustrative example, metal 2300 may be, for example, gold, silver, aluminum, and/or some other suitable type of metal. As a result, mirror 2308 is ready for mounting.

Figure 24:
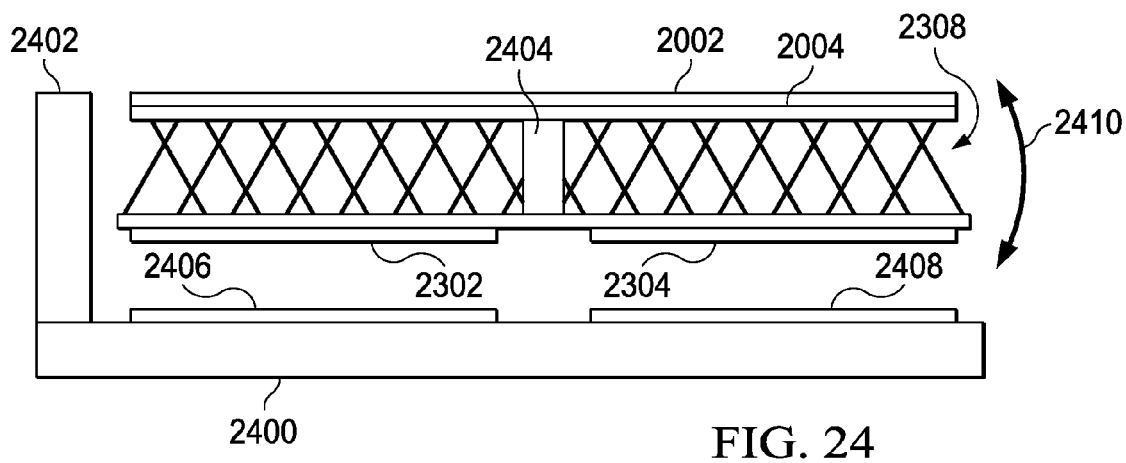
FIG. 24 is a plan view of mirrors in accordance with an advantageous embodiment.

Turning now to FIG. 24, a cross-sectional view of a mirror structure on a bias board and support structure is depicted in accordance with an advantageous embodiment.

In this illustrative example, mirror 2308 is mounted on bias board 2400 and support structure 2402. Support structure 2402 may provide support for torsion beam 2404 on mirror 2308. Bias board 2400 has electrodes 2406 and 2408, which may cause mirror 2308 to tilt along the direction of arrow 2410. This tilting or movement about arrow 2410 may tilt around an axis defined by torsion beam 2404 in these illustrative examples. The tilting of mirror 2308 may be through a number of different degrees when an electrostatic bias is applied through electrodes 2406 and 2408 using bias board 2400.

Figure 25:
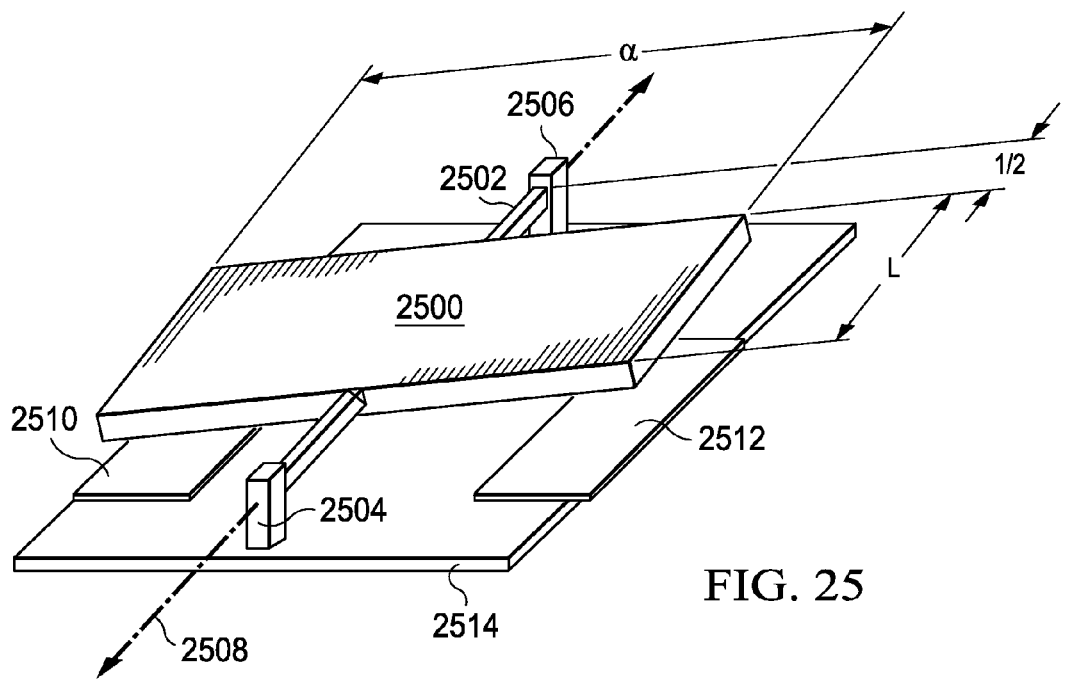
FIG. 25 is a diagram of a perspective view of a mirror in accordance with an advantageous embodiment.

Turning now to FIG. 25, a diagram of a perspective view of a mirror is depicted in accordance with an advantageous embodiment. In this illustrative example, mirror 2500 may be implemented using mirror 2308 in FIG. 23. In this example, torsion beam 2502 for mirror 2500 is mounted onto anchors 2504 and 2506. Mirror 2500 may be tilted about axis 2508 in response to an electrical bias supplied by electrodes 2510 and 2512 on bias board 2514.

Although mirror 2500 is a mechanical mirror, mirror 2500 is switched using electrical signals. In other words, electrical signals cause the mechanical movement of mirror 2500.

Figure 26:
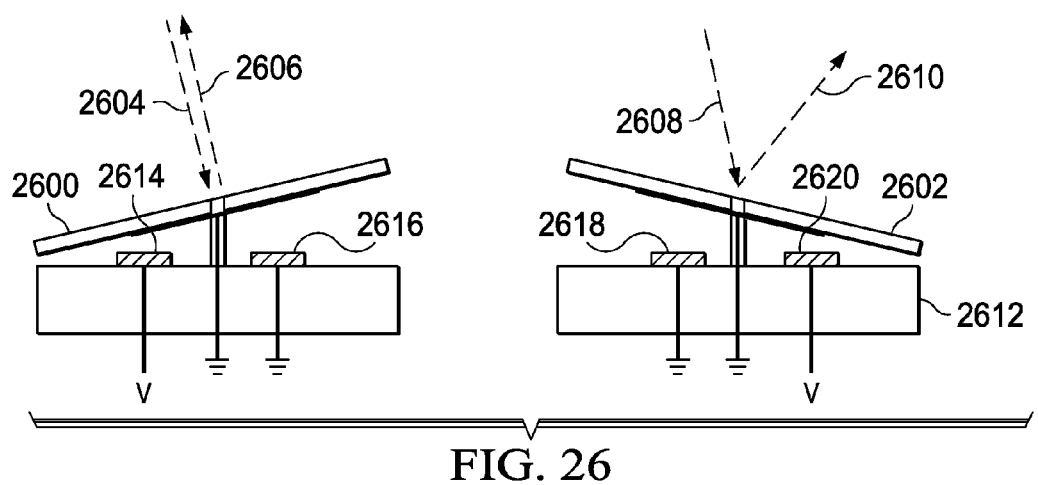
FIG. 26 is a diagram illustrating mirror positions in accordance with an advantageous embodiment.

Turning now to FIG. 26, a diagram illustrating mirror positions is depicted in accordance with an advantageous embodiment. In this illustrative example, mirror 2600 and mirror 2602 are examples of mirrors in a mirror array, such as mirror array 112 in FIG. 1.

Mirror 2600 has a position that reflects signal 2604 back towards a source as shown by reflected signal 2606. Mirror 2602 is biased to reflect signal 2608 as reflected signal 2610 towards a detector. In these illustrative examples, the positions of mirrors 2600 and 2602 are controlled by bias board 2612 in the application of electrical signals to electrodes 2614, 2616, 2618, and 2620.

Figure 27:
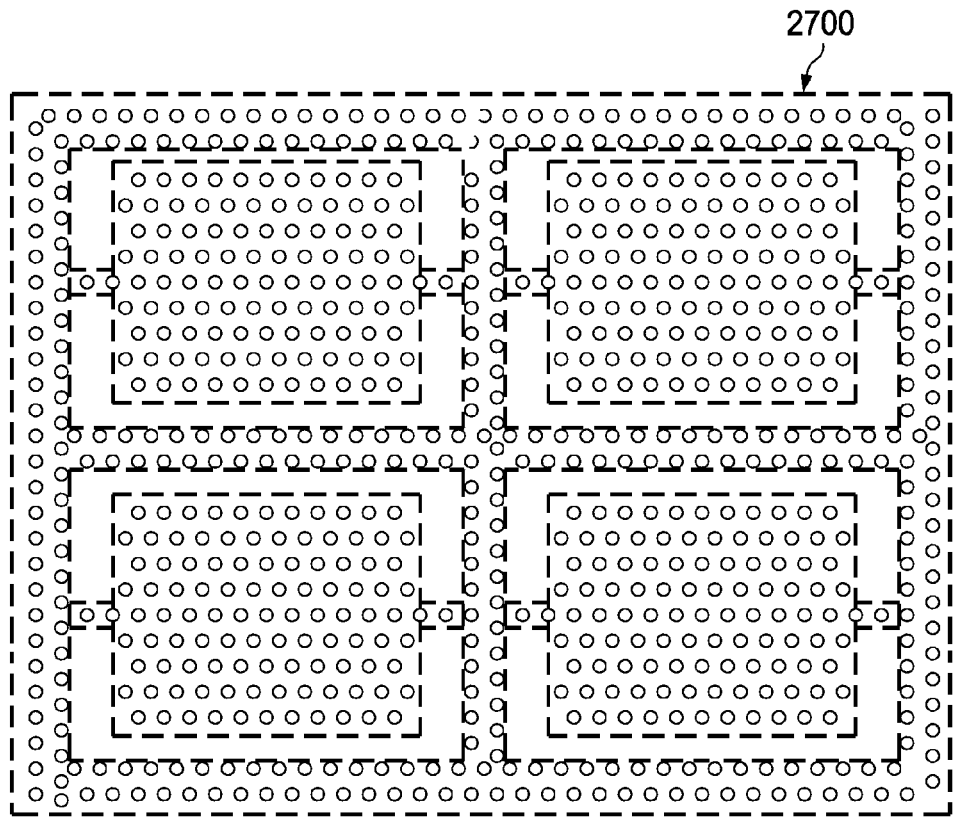
FIG. 27 is a plan view of a photomask for a mirror surface in accordance with an advantageous embodiment.

With reference now to FIG. 27, a plan view of a photomask for a mirror surface is depicted in accordance with an advantageous embodiment. In this illustrative example, photomask 2700 may be used in place of photomask 1400 in FIG. 14 to form a mirror. In this illustrative example, photomask 2700 may be used as the mirror's surface. In this type of embodiment, photomask 2700 takes the form of a metal sheet capable of reflecting millimeter waves.

Figure 28:
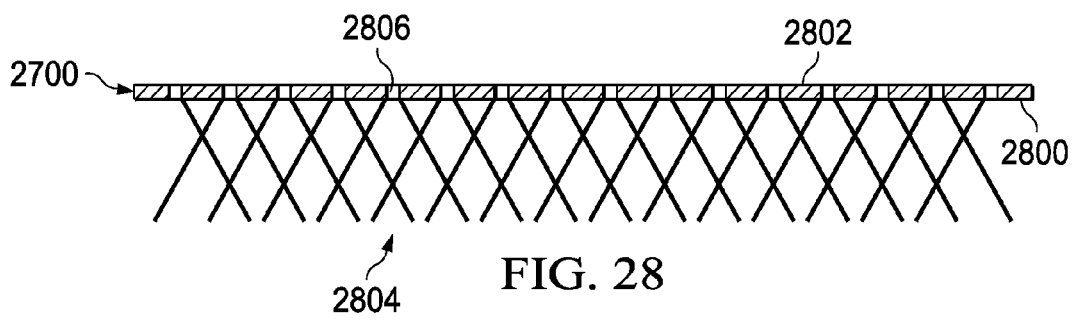
FIG. 28 is a cross-sectional view illustrating fabrication of a mirror on a microtruss structure in accordance with an advantageous embodiment.

Turning now to FIG. 28, a cross-sectional view illustrating fabrication of a mirror on a microtruss structure is depicted in accordance with an advantageous embodiment. In this illustrative example, photomask 2700 forms mirror base 2800 with reflective surface 2802. Microtruss structure 2804 is formed through ultraviolet light passing through holes 2806 in this example.

The different cross sections, plan views, and schematic diagrams shown in FIGS. 3-23 and FIGS. 26-27 are not meant to illustrate all of the operations and processes used to fabricate the mirrors for a mirror array. Other operations may be present that can be a part of the operations illustrated. Only some of the operations have been depicted to avoid obscuring features of the different advantageous embodiments. For example, an explanation and diagrams for manufacturing photomasks have not been shown. Other steps, such as etching layers, have not been illustrated. Further, other processes and combinations of operations may be used to form these mirrors illustrated in these figures.

Figure 29:
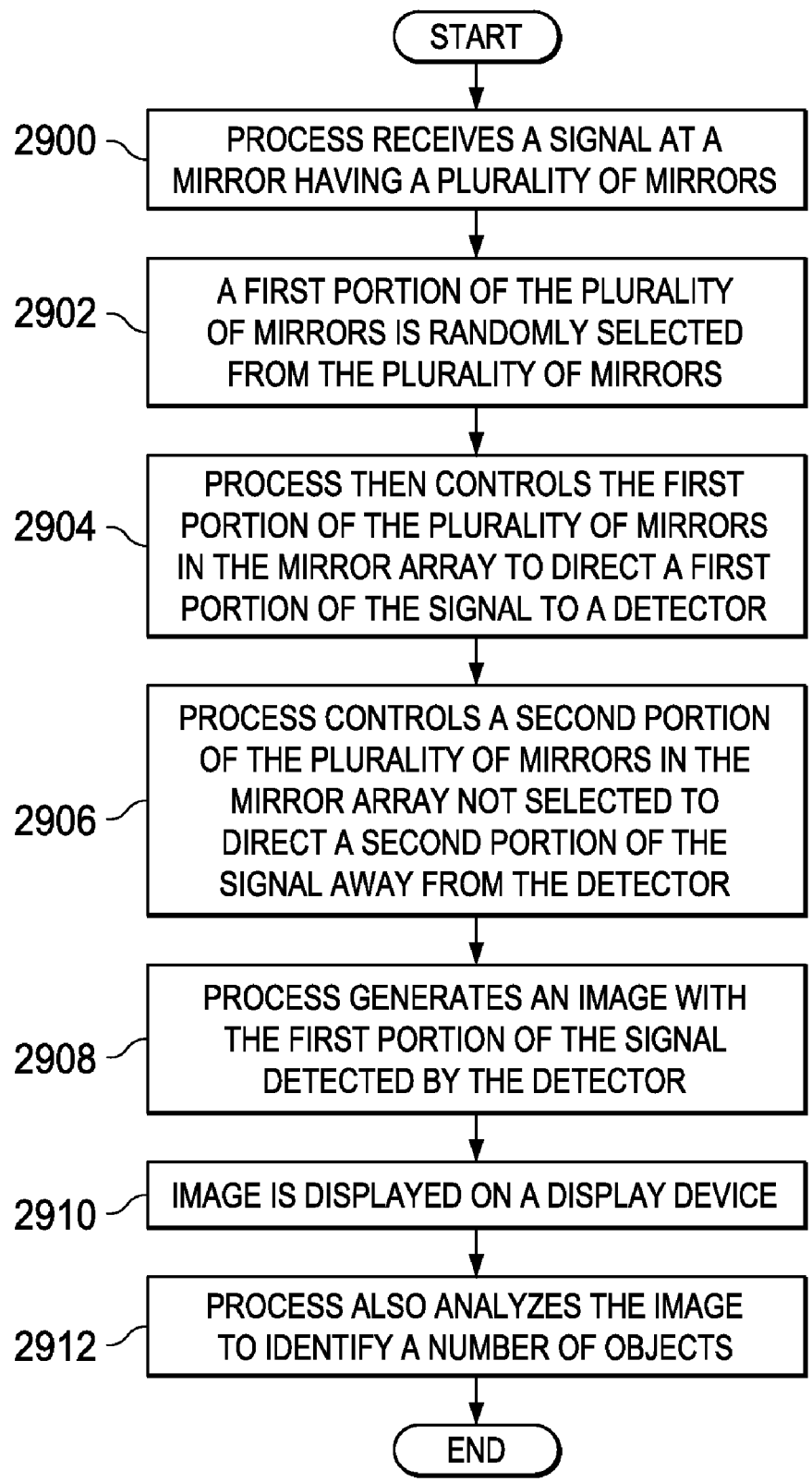
FIG. 29 is a flowchart of a process for directing a signal in accordance with an advantageous embodiment.

With reference now to FIG. 29, a flowchart of a process for directing a signal is depicted in accordance with an advantageous embodiment. The process illustrated in FIG. 29 may be implemented in an imaging system such as, for example, millimeter wave imaging system 102 in FIG. 1.

The process begins by receiving a signal at a mirror having a plurality of mirrors (operation 2900). A first portion of the plurality of mirrors is randomly selected from the plurality of mirrors (operation 2902). The process then controls the first portion of the plurality of mirrors in the mirror array to direct a first portion of the signal to a detector (operation 2904). The process controls a second portion of the plurality of mirrors in the mirror array not selected to direct a second portion of the signal away from the detector (operation 2906).

The process then generates an image with the first portion of the signal detected by the detector (operation 2908). The image is displayed on a display device (operation 2910). The process also analyzes the image to identify a number of objects (operation 2912), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, some of the operations illustrated in FIG. 29 may be omitted. As a particular example, the image may only be displayed or analyzed instead of both being displayed and analyzed as illustrated in the process in FIG. 29.

Thus, the different advantageous embodiments provide a method and apparatus for an imaging apparatus. In the different advantageous embodiments, the apparatus has a mirror array and a control system. The mirror array has a plurality of mirrors in which the mirrors are capable of receiving a signal for the image. The control system is capable of controlling the first portion of the plurality of mirrors in the mirror array to direct a first portion of the signal to a detector and capable of controlling a second portion of the plurality of mirrors in the mirror array to direct a second portion of the signal away from the detector.

The different advantageous embodiments provide a capability to switch portions of a signal onto a detector in a manner that may be more cost effective than the currently available systems for obtaining a portion of a signal. The cost complexity of having a detector with a plurality of sections that may selectively receive a signal may be avoided using one or more of the different advantageous embodiments. Further, the different advantageous embodiments provide a capability to scan or direct a signal onto a detector more quickly than selectively scanning a signal onto a detector.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A millimeter wave imaging apparatus comprising:
a mirror array having a plurality of electronically tunable impedance surface mirrors, wherein the plurality of mirrors is capable of receiving a millimeter wave signal, the array comprising a number of diodes disposed such that a change in impedance of a diode directs a millimeter wave signal received at a mirror to a desired direction;
the mirror array further comprising a polymer microtruss, a substrate, a bias board, a number of connectors, and a number of patches connected to the diodes, the diodes are mounted on the number of patches, and the number of connectors are connected to the bias board and the number of patches;
a control system capable of controlling a first portion of the plurality of mirrors on the polymer microtruss in the mirror array to direct a first portion of the millimeter wave signal to a detector, and capable of controlling a second portion of the plurality of mirrors on the polymer microtruss in the mirror array to direct a second portion of the signal away from the detector;
an image processor capable of creating an image using the first portion of the signal detected by the detector; and
a display device in communication with the image processor, wherein the image processor is capable of displaying the image on the display device.

2. The millimeter wave imaging apparatus of claim 1, wherein the millimeter wave signal is a response millimeter wave signal and further comprising:
a transmitter, wherein the transmitter is capable of being controlled by the image processor to transmit the millimeter wave signal to generate the response millimeter wave signal.

3. The millimeter wave imaging apparatus of claim 1, wherein the mirror array, the control system, the image processor, and the display device form a millimeter wave imaging system and further comprising:
a platform, wherein the millimeter wave imaging system is associated with the platform and wherein the platform is selected from one of a vehicle, a portable housing, and a station.

4. The apparatus of claim 1, wherein the number of diodes comprise varactor diodes.

5. The apparatus of claim 4, wherein the number of varactor diodes are disposed in an alternating pattern.

6. The apparatus of claim 1, wherein each mirror in the mirror array is separately controlled by the control system.

7. The apparatus of claim 1, wherein the control system selects periodically a number of mirrors in the first portion of the plurality of mirrors.

8. The apparatus of claim 1, wherein the control system selects randomly a number of mirrors in the first portion of the plurality of mirrors.

9. The apparatus of claim 1 wherein the polymer microtruss is formed by exposing a polymer solution to ultraviolet light.

10. The apparatus of claim 9, wherein the polymer solution comprises thiolene monomer.

11. The apparatus of claim 10 wherein the tiolene monomer is mixed with 2,2-dimethoxy-2-phenylacetophenone as a photoinitiator.

12. An apparatus comprising:
a mirror array having a plurality of mirrors, wherein the plurality of mirrors is capable of receiving a signal for an image, the mirror array including a bias board and a number of electrodes;
the mirror array further comprising a polymer microtruss structure, a substrate, a bias board, a number of connectors, and a number of patches connected to the electrodes, the electrodes are mounted on the number of patches, and the number of connectors are connected to the bias board and the number of patches; and
a control system capable of controlling the bias board and the number of electrodes so as to control movement of a first portion of the plurality of mirrors on the polymer microtruss structure in the mirror array to direct a first portion of the signal to a detector and so as to control movement of a second portion of the plurality of mirrors in the polymer microtruss structure in the mirror array to direct a second portion of the signal away from the detector.

13. The apparatus of claim 12, wherein the signal is a response signal and further comprising:
a transmitter, wherein the transmitter is capable of transmitting signals to generate the response signal.

14. The apparatus of claim 12 further comprising:
a processor unit capable of creating the image using the first portion of the signal detected by the detector.

15. The apparatus of claim 14 further comprising:
a display device, wherein the processor unit is capable of displaying the image on the display device.

16. The apparatus of claim 14 further comprising:
a storage device; and program code stored on the storage device, wherein the program code is capable of being executed by the processor unit to analyze the image.

17. The apparatus of claim 12, wherein the control system is capable of randomly selecting a number of mirrors in the first portion of the plurality of mirrors in the mirror array.

18. The apparatus of claim 12, wherein a mirror in the plurality of mirrors in the mirror array is controlled by the control system so as to tilt about a number of axes.

19. The apparatus of claim 18, wherein the mirror comprises:
the microtruss structure comprising a plurality of elongate polymer waveguides, the polymer waveguides intersecting to form a node; and
a reflective surface formed on the microtruss structure.

20. The apparatus of claim 12, wherein the signal has a wavelength from about 1 millimeter to about 10 millimeter and a frequency from about 30 gigahertz to about 300 gigahertz.

21. The apparatus of claim 12, wherein the plurality of mirrors and the control system form an imaging system and further comprising:
a platform, wherein the imaging system is associated with the platform.

22. The apparatus of claim 21, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a station, and a portable housing.

23. A method for directing a signal, the method comprising:
receiving a signal at a mirror array having a plurality of electronically tunable impedance surface mirrors, the array comprising a number of diodes disposed such that a change in impedance of a diode directs a millimeter wave signal received at a mirror to a desired location, the mirror array further comprising a polymer microtruss, a substrate, a bias board, a number of connectors, and a number of patches connected to the diodes, the diodes are mounted on the number of patches, and the number of connectors are connected to the bias board and the number of patches;
controlling a first portion of the plurality of mirrors in the mirror array on the polymer microtruss to direct a first portion of the signal to a detector; and
controlling a second portion of the plurality of mirrors in the mirror array on the polymer microtruss to direct a second portion of the signal away from the detector,
the controlling the first portion comprising controlling voltage supplied to a bias board so as to control impedance at the number of diodes connected to a number of mirrors in the first portion, and the controlling the second portion comprising controlling voltage supplied to a bias board so as to control impedance at a number of diodes connected to a number of mirrors in the second portion.

24. The method of claim 23 further comprising:
randomly selecting the first portion of the plurality of mirrors from the plurality of mirrors.

25. The method of claim 23 further comprising:
generating an image with the first portion of the signal.

26. The method of claim 25 further comprising:
displaying the image on a display device.

27. The method of claim 25 further comprising:
analyzing the image to identify a number of objects.

* * * * *